US008944693B2

(12) United States Patent
Katsuno

(10) Patent No.: US 8,944,693 B2
(45) Date of Patent: Feb. 3, 2015

(54) ROLLING BEARING CAGE AND ROLLING BEARING

(75) Inventor: Yoshiaki Katsuno, Fujisawa (JP)

(73) Assignee: NSK Ltd., Tokyo (JP)

( * ) Notice: Subject to any disclaimer, the term of this patent is extended or adjusted under 35 U.S.C. 154(b) by 0 days.

(21) Appl. No.: 14/343,107

(22) PCT Filed: Sep. 5, 2012

(86) PCT No.: PCT/JP2012/072627
§ 371 (c)(1),
(2), (4) Date: Mar. 6, 2014

(87) PCT Pub. No.: WO2013/035745
PCT Pub. Date: Mar. 14, 2013

(65) Prior Publication Data
US 2014/0226929 A1 Aug. 14, 2014

(30) Foreign Application Priority Data

Sep. 6, 2011 (JP) ................................ 2011-194165

(51) Int. Cl.
*F16C 33/38* (2006.01)
*F16C 33/41* (2006.01)
*F16C 33/46* (2006.01)
(Continued)

(52) U.S. Cl.
CPC ......... *F16C 33/4676* (2013.01); *F16C 33/3856* (2013.01); *F16C 33/416* (2013.01); *F16C 33/3887* (2013.01); *F16C 33/418* (2013.01); *F16C 33/4635* (2013.01); *F16C 19/06* (2013.01); *F16C 19/163* (2013.01)
USPC .......................................... 384/531; 384/533

(58) Field of Classification Search
CPC ..... F16C 33/416; F16C 33/418; F16C 33/498
USPC ................. 384/531, 532, 576, 577, 533, 534
See application file for complete search history.

(56) References Cited

U.S. PATENT DOCUMENTS 7,044,645 B2 * 5/2006 Yamamoto ..................... 384/531
2003/0103703 A1 * 6/2003 Ishiwada et al. ............... 384/531

FOREIGN PATENT DOCUMENTS

JP 02132125 U 11/1990
JP 09158951 A 6/1997
(Continued)

OTHER PUBLICATIONS

ISR (PCT/ISA/210) Issued Nov. 13, 2012, in corresponding International Application No. PCT/JP2012/072627.
(Continued)

*Primary Examiner* — Phillip A Johnson
(74) *Attorney, Agent, or Firm* — Sughrue Mion, PLLC

(57) ABSTRACT

Each pocket of a cage have a cylindrical surface formed by a cylindrical shape having a center line extending in a radial direction, and a tapered surface contiguous with the cylindrical surface. A radial displacement of the cage is regulated by a contact of the ball with the tapered surface. In a state in which the ball is in contact with the tapered surface, an angle formed by an imaginary line extending through a contact point between the ball and the tapered surface and the center of the ball, and an imaginary perpendicular plane extending through the center of the ball and perpendicular to the radial direction, is larger than a friction angle defined by a friction coefficient at the contact point between the ball and the tapered surface.

8 Claims, 13 Drawing Sheets

(51) Int. Cl.
*F16C 19/06* (2006.01)
*F16C 19/16* (2006.01)

(56) References Cited

FOREIGN PATENT DOCUMENTS

| | | |
|---|---|---|
| JP | 2002503326 A | 1/2002 |
| JP | 2006017301 A | 1/2006 |
| JP | 2006242284 A | 9/2006 |
| JP | 2007333084 A | 12/2007 |
| WO | 2010067852 A1 | 6/2010 |

OTHER PUBLICATIONS

Written Opinion (PCT/ISA/237) Issued Nov. 13, 2012, in corresponding International Application No. PCT/JP2012/072627.

* cited by examiner

FIG. 13A
FIG. 13B
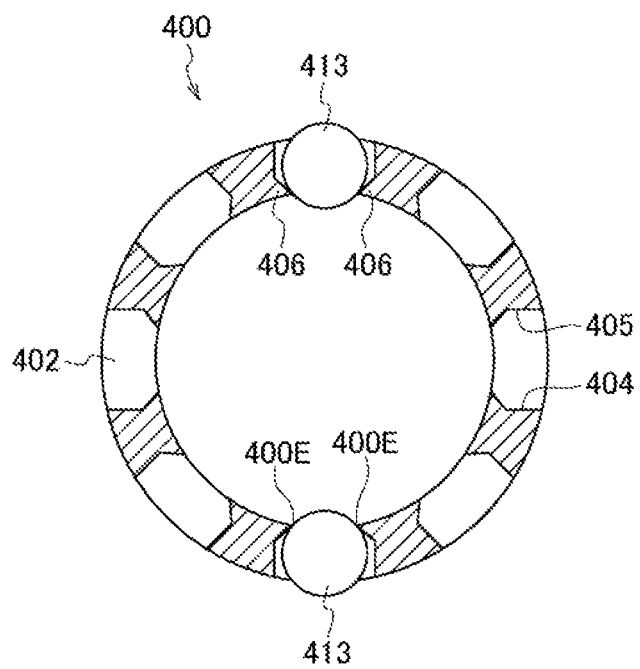
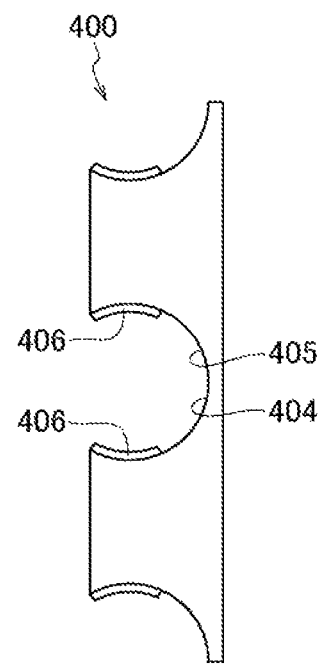

ROLLING BEARING CAGE AND ROLLING BEARING

TECHNICAL FIELD

The present invention relates to a rolling bearing cage and a rolling bearing, and more particularly, to a rolling bearing to be applied in a high-speed rotating region, such as drive motors used in general industrial machinery, machine tools and the like or spindle devices for machine tools, and to a cage used in the rolling bearing.

BACKGROUND ART

Recently, for drive motors used in general industrial machinery, machine tools and the like, motors having a very high rotation speed have been emerged. In particular, motors for driving spindles of machine tools have a strong tendency of increase in speed in accordance with increasing speed of spindles of machine tools.

In a case of a medium/high-speed spindle, for example, if a revolution number of the spindle is about 10000 $min^{-1}$ or less, a drive motor having a highest rotation speed of about 5000 to 8000 $min^{-1}$ may be used, and gears or belts may be used to increase the speed. However, in a case of a high-speed spindle, for example, if a revolution number of the spindle is about 15000 to 20000 $min^{-1}$, a speed-up ratio by gears or belts becomes two times or more, and thus to transmit an appropriate driving force, diameters of gears or diameters of belt pulleys are increased also, thereby significantly increasing a peripheral speed or a rotation speed in such transmission portion. As a result, in the case of gear driven type, a noise in meshed portions of gears and wearing or chipping of teeth thereof are likely to occur, and in the case of belt driven type, slipping, flapping, wearing, breaking and the like of belts are likely to occur.

Due to these reasons, a method of driving a spindle is being changed from gear-driven or belt-driven methods to a direct driving method using a coupling. With a direct coupling connection driving method, a driving torque is directly transmitted to the spindle via the coupling, and therefore a load component by a driving force is not generated in a bearing that supports a drive motor. However, because a rotation speed of the drive motor becomes the same revolution number as that of the spindle, high-speed bearings have correspondingly been required.

Conventionally, for 4-pole or 2-pole general purpose motors (a revolution number of about 1500 to 3600 $min^{-1}$), deep groove ball bearings (not shown) employing a press-molded iron cage 100 having spherical pockets 111 as shown in FIG. 10 have been used. More specifically, the cage 100 has a pair of annular portions 110, 110 coupled to each other in an axial direction. The annular portions 110 includes, when being coupled to each other in the axial direction, a plurality of pockets 11 for rollably retaining a plurality of balls 103, and a plurality of flat surface portions 112 each provided between adjacent pockets 111, 111. The flat surface portions 112, 112 of the pair of annular portions 110, 110 are fixed to each other by metal rivets 113.

For medium/high-speed motors (a revolution number of about 5000 to 8000 $min^{-1}$), deep groove ball bearings employing a high wear resistant crown type synthetic resin cage 200 having spherical pockets 211 like the cage 100 of FIG. 10 as shown in FIG. 11 have been used. More specifically, the crown type synthetic resin cage 200 has a substantially annular base portion 213, and a plurality of pillar portions 217 protruding from an axial end face 215 of the base portion 213 and arranged at given intervals in a circumferential direction, and the opposing surfaces 219, 219 of a pair of adjacent pillar portions 217, 217 and the axial end face 215 of the base portion 213 form the pocket 211 for retaining a rolling element 220.

As for other cages, a synthetic resin cage 300 has been devised, in which, as shown in FIG. 12, hemispherical pockets 304 for retaining rolling elements (not shown) are provided on two pieces of annular portions 301, 301 at equal intervals in a circumferential direction and engaging pawls 306 and engaging holes 305 that are engageable with each other are provided on coupling portions 303 between the adjacent pockets 304 (see Patent Document 1).

Further, according to Patent Document 2, as shown in FIG. 13, a crown type cage 400 has a plurality of pockets 402 opened to both sides in a radial direction, each pocket 402 being formed such that a straight hole 405 having an peripheral wall 404 extending along a center line in the radial direction is formed, and projections 406, 406 for retaining the ball 413 is formed on an inner diameter-side edge of the straight hole 405 so as to be opposed to each other in a direction toward the center axis of the straight hole 405. This configuration is aimed to suppress vibrations of the cage in the radial direction, thereby improving abrasion and wear resistance properties and preventing generation of a cage noise during rotation.

PRIOR ART DOCUMENT

Patent Document

Patent Document 1: JP 2006-17301 A
Patent Document 2: JP 9-158951 A

SUMMARY OF INVENTION

Problem to be Solved by Invention

However, according to the cage 100 as shown in FIG. 10, the flat surface portions 112, 112 of the pair of annular portions 110, 110 are fixed to each other by metal rivets 113, and therefore strength of the flat surface potions 112, 112 can be maintained even during high-speed rotation, but because the cage 100 is made of iron, there is a risk that inner surfaces of the pockets 111 are worn by rotation of the balls 103.

According to the cage 300 disclosed in Patent Document 1 and as shown in FIG. 12, abrasion and wear resistance properties of the pockets 304 are improved as compared with the metal cage 100 (see FIG. 10). However, because a cross section thickness of the engaging pawls 306 and a cross section thickness of the periphery of the engaging holes 306, which are for combining two pieces of annular portions 301, 301, are thin, problems such as cracking or breakage due to stress concentration at the base portions of the engage claws 306 or edge portions of the engaging holes 305 are very likely to be caused by high-frequency vibration load exerted on the cage 300 during high-speed rotation or repetitive load received from the rolling elements. Even if attempting to improve strength of such portions, a space required to increase the thickness of the engaging pawls 306 or the periphery of the engaging holes 305 is limited.

The cage 400 disclosed in Patent Document 2 and as shown in FIG. 13 has the highest reliability for high-speed applications as compared with the cages described above, but as the balls 41 or the cage 400 is displaced, the balls 413 and edge portions 400E of the pockets 402 are brought into contact with each other, and therefore, because a surface pressure in such a contact portion is increased, problems such as an increase of sliding friction torque, creep deformation in the contact portion and local wear may occur. In addition, a lubricant inside the bearing is scraped by the contact portion between the balls 413 and the edge portions 400E of the pockets 402, which may cause a lack of lubrication, and as a result, a self-exited vibration of the crown type cage 400 may occur by disturbance in friction coefficient and a cage noise may be generated.

Also in any of the cages 100, 200, 200 described above, such contact between the rolling elements 103, 220 (for the cage 300, rolling elements are not shown in FIG. 12) and the edge portions 100E, 200E, 300E of the pockets 111, 211, 304 may occur, and therefore, various problems as described above may occur.

The present invention has been made in view of the problems described above, and an object thereof is to provide a rolling bearing cage which can prevent progression of problems in contact portions between rolling elements and the cage even during high-speed rotation, and a rolling bearing having the cage.

Means for Solving the Problem

The above object of the present invention is achieved by the following configurations.

(1) A rolling bearing cage of a ball guided type, the cage including a plurality of pockets provided at given intervals in a circumferential direction to retain a plurality of balls respectively,
wherein each pocket of the cage includes a cylindrical surface formed by a cylindrical shape having a center line extending in a radial direction, and a tapered surface contiguous with cylindrical surface on a radially inner side or a radially outer side of the cylindrical surface and extending away from the cylindrical surface in the radial direction and toward the center line;
wherein a radial displacement of the cage is regulated by a contact of the ball with the tapered surface, and
wherein, in a state in which the ball is in contact with the tapered surface, an angle formed by an imaginary line extending through a center of the ball and a contact point between the ball and the tapered surface, and an imaginary perpendicular plane extending through the center of the ball and perpendicular to the radial direction, is larger than a friction angle defined by a friction coefficient at the contact point between the ball and the tapered surface.

(2) The rolling bearing cage as set forth in (1), wherein the pocket includes a pair of said tapered surfaces provided on adjacent pillar portions respectively and opposed to each other in the circumferential direction, and
wherein the tapered surfaces are formed by convex portions provided on a radially inner side or a radially outer side of the pillar portions and extending toward the center line.

(3) A rolling bearing cage of a roller guided type, the cage including a plurality of pockets provided at given intervals in a circumferential direction to retain a plurality of cylindrical rollers respectively,
wherein each pocket of the cage includes a pair of flat surfaces parallel to a center line extending in a radial direction, and a tapered surface continuous with the flat surfaces on a radially inner side or a radially outer side of the flat surfaces and extending away from the flat surfaces in the radial direction and toward the center line;
wherein a radial displacement of the cage is regulated by a contact of the cylindrical roller with the tapered surface, and
wherein, in a state in which the cylindrical roller is in contact with the tapered surface, an angle formed by an imaginary plane including a center axis of the cylindrical roller and a contact line between the cylindrical roller and the tapered surface, and an imaginary perpendicular plane extending through the center axis of the cylindrical roller and perpendicular to the radial direction, is larger than a friction angle defined by a friction coefficient at a contact location between the cylindrical roller and the tapered surface.

(4) The rolling bearing cage as set forth in (3), wherein the pocket includes a pair of said tapered surfaces provided on adjacent pillar portions respectively and opposed to each other in the circumferential direction, and
the tapered surfaces are formed by convex portions provided on a radially inner side or a radially outer side of the pillar portions and extending toward the center line.

(5) The rolling bearing cage as set forth in any one of (1) to (4), wherein the cage is made of a synthetic resin.

(6) A rolling bearing including the rolling bearing cage as set forth in any one of (1) to (5).

Effects of Invention

According to the rolling bearing cage of the present invention, each pocket of the cage includes a cylindrical surface formed by a cylindrical shape having a center line extending in a radial direction, and a tapered surface contiguous with cylindrical surface on a radially inner side or a radially outer side of the cylindrical surface and extending away from the cylindrical surface in the radial direction and toward the center line, and a radial displacement of the cage is regulated by a contact of the balls with the tapered surfaces. Therefore, when the cage is displaced in the radial direction, the balls contact the tapered surfaces of the pockets, and thus an edge contact is not caused, thereby decreasing a contact surface pressure and also preventing scraping of a lubricant. In addition, because the contact of the cage with the balls is limited to the tapered surfaces, a friction coefficient is stabilized, thereby preventing a generation of a cage noise due to a self-exited vibration of the cage.

Further, in a state in which the ball is in contact with the tapered surface, an angle formed by an imaginary line extending through a center of the ball and a contact point between the ball and the tapered surface, and an imaginary perpendicular plane extending through the center of the ball and perpendicular to the radial direction, is set to be larger than a friction angle defined by a friction coefficient at the contact point between the ball and the tapered surface. Therefore, even when the balls are strongly pressed against the tapered surfaces of the pockets or when the balls are fitted into the tapered surfaces due to wedge effect, the cage can return to its original rotational neutral position once a force on the tapered surfaces is removed. As a result, progression of problems at the contact points between the balls and the tapered surfaces can be prevented.

In addition, according to the rolling bearing cage of the present invention, each pocket of the cage includes a pair of flat surfaces parallel to a center line extending in a radial direction, and a tapered surface contiguous with the flat surfaces on a radially inner side or a radially outer side of the flat surfaces and extending away from the flat surfaces in the radial direction and toward the center line, and a radial displacement of the cage is regulated by a contact of the cylindrical roller with the tapered surface. Therefore, when the cage is displaced in the radial direction, the cylindrical rollers contact the tapered surfaces of the pockets, and thus an edge contact is not caused, thereby decreasing a contact surface pressure and also preventing scraping of a lubricant. In addition, because the contact of the cage with the cylindrical rollers is limited to the tapered surfaces, a friction coefficient is stabilized, thereby preventing a generation of a cage noise due to a self-exited vibration of the cage.

Further, in a state in which the cylindrical roller is in contact with the tapered surface, an angle formed by an imaginary plane including a center axis of the cylindrical roller and a contact line between the cylindrical roller and the tapered surface, and an imaginary perpendicular plane extending through the center axis of the cylindrical roller and perpendicular to the radial direction, is set to be larger than a friction angle defined by a friction coefficient at a contact location between the cylindrical roller and the tapered surface.

Therefore, even when the cylindrical rollers are strongly pressed against the tapered surfaces of the pockets or when the cylindrical rollers are fitted into the tapered surfaces due to wedge effect, the cage can return to its original rotational neutral position once a force on the tapered surfaces is removed. As a result, progression of problems at the contact points between the cylindrical rollers and the tapered surfaces can be prevented.

BRIEF DESCRIPTION OF THE DRAWINGS

FIG. 13A is a sectional view of a conventional cage, and FIG. 13B is a partial plan view of FIG. 13A.

EMBODIMENTS OF INVENTION

Hereinafter, embodiments of a rolling bearing cage and a rolling bearing according to the present invention will be described in detail with reference to the drawings.

(First Embodiment)

Figure 1:
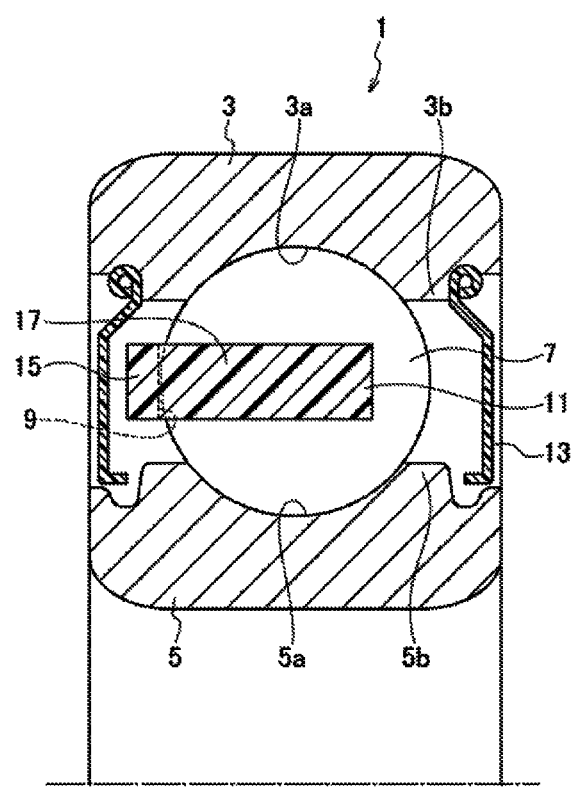
FIG. 1 is a sectional view of a deep groove ball bearing according to a first embodiment of the present invention.

A deep groove ball bearing 1 having a crown type cage 11 according to a first embodiment of the present invention will be first described. As shown in FIG. 1, the deep groove ball bearing 1 includes an outer ring 3 having an outer ring raceway 3a on an inner peripheral surface thereof, an inner ring 5 having an inner ring raceway 5a on an outer peripheral surface thereof, a plurality of balls 7 rollably provided between the outer ring raceway 3a and the inner ring raceway 5a, and the crown type cage 11 adapted to rollably retain the balls 7 in pockets 9 and arranged between the outer ring 3 and the inner ring 5. Grease as a lubricant is potted in the inner space of the deep groove ball bearing 1.

The inner peripheral surface of the outer ring 3 has shoulder portions 3b formed on both sides in an axial direction of the outer ring raceway 3a, and the outer peripheral surface of the inner ring 5 has shoulder portions 5b formed on both sides in an axial direction of the inner ring raceway 5a. Also, seal members 13 having a core bar covered with an elastic body, such as a rubber, and formed in an annular shape is provided in openings on both sides in the axial direction of the outer ring 3 and the inner ring 5, thereby preventing the grease from being flowed out from the inside.

Figure 2A:
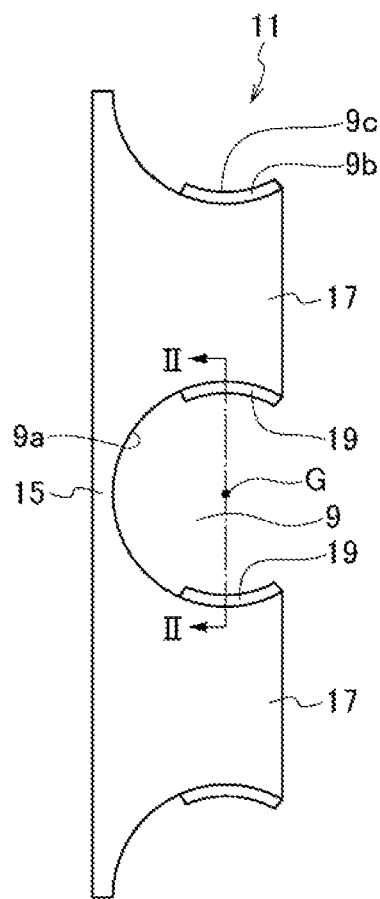
FIG. 2A is a plan view of a portion of a crown type cage shown in FIG. 1.
Figure 2B:
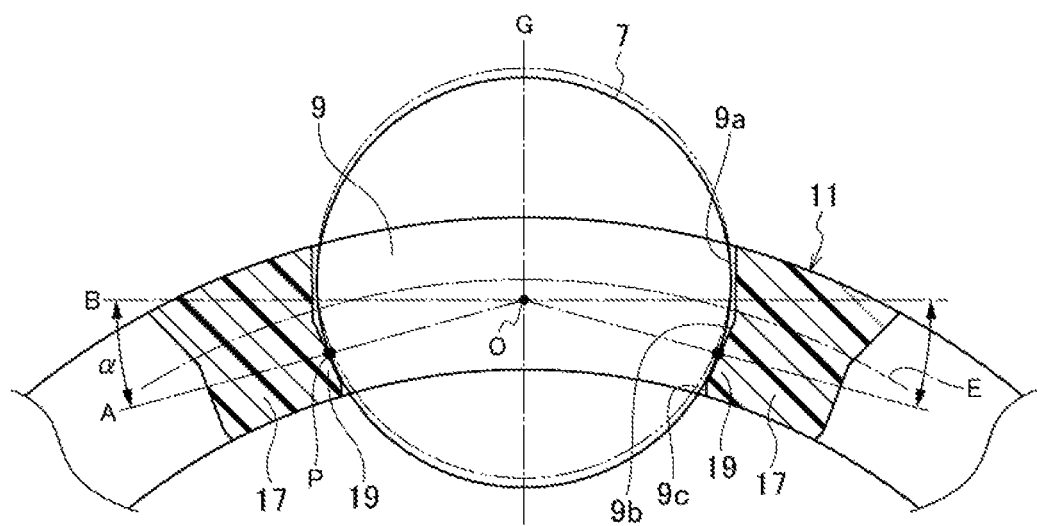
FIG. 2B is a partially sectional view taken along the line II-II in FIG. 2A.

Referring to FIGS. 2A and 2B, the crown type cage 11 is a ball guided type cage made of a synthetic resin and includes an annular portion 15 and a plurality of pillar portions 17 axially extending from the annular portion 15 and arranged at given intervals in a circumferential direction thereof, and the annular portion 15 and the adjacent pillar portions 17, 17 form a plurality of pockets 9 for rollably retaining the balls 7. As the synthetic resin material for the crown type cage 11, one is used in which glass fibers (GF) are added to polyamide (PA) resin to enhance strength thereof.

Each pocket 9 of the crown type cage 11 has a cylindrical surface 9a formed by a cylindrical shape having a center line G extending in a radial direction and opened on one side thereof in an axial direction, and a pair of tapered surfaces 9b contiguous with the cylindrical surface 9a on a radially inner side of the cylindrical surface 9a and extending away from the cylindrical surface 9a in the radial direction and toward the center line G Namely, the pocket 9 is penetrated on both sides in the radial direction, and also opened on one side (the right side in FIG. 2A) in the axial direction.

The pair of tapered surfaces 9b, which are respectively provided on the adjacent pillar portions 17, 17, are formed by inner diameter-side convex portions 19, 19 extending from the cylindrical surface 9a toward the center line G, and arranged along the cylindrical surface 9a on both sides in a circumferential direction of the pocket 9. In this way, because the inner diameter-side convex portions 19 forming the tapered surfaces 9b are not provided on the other side (the left side in the FIG. 2A) in the axial direction inside the pocket 9, a gap is generated between the ball 7 and the pocket 9, thereby allowing a lubricant to be supplied through the gap.

The pair of tapered surfaces 9b are contiguous with the cylindrical surface 9a on the more inner diameter-side than an equatorial portion (a position of a pitch circle of the ball 7) E of the ball 7, are formed on a single imaginary conical surface, and also have a generally circular arc shape as viewed in the radial direction.

The inner diameter-side convex portions 19 have, on inner diameter-side ends of the tapered surfaces 9b, straight surfaces 9c formed substantially parallel to the center axis G by chamfering. The straight surfaces 9c prevent occurrences of problems, such as burs or whiskers, during machining or injection-molding of the crown type cage 11. Alternatively, on the inner diameter-side convex portions 19, rounded curved surfaces may be formed, instead of the above straight surfaces 9c.

Herein, a radial displacement of the crown type cage 11 is regulated by a contact of the balls 7 with the tapered surfaces 9b of the inner diameter-side convex portions 19. Namely, when the crown type cage 11 is moved radially outward, i.e., when the balls 7 are relatively moved radially inward (as shown by a solid line in FIG. 2B), the crown type cage 11 is configured so that contact thereof with the balls 7 is limited to the tapered surfaces 9b.

Thus, when the crown type cage 11 is displaced in the radial direction, the balls 7 can be contacted with the tapered surfaces 9b of the pockets 9, and thus an edge contact cannot be caused, thereby decreasing a contact surface pressure and also preventing scraping of the lubricant. In addition, because contact of the cage with the balls 7 is limited to the tapered surfaces 9b, a friction coefficient can be stabilized, thereby preventing generation of a cage noise due to a self-exited vibration of the crown type cage 11.

In a state in which the ball 7 and the tapered surfaces 9b contact with each other, a contact point between the ball 7 and the tapered surface 9b is denoted by P, the center of the ball 7 when the ball 7 is contacting the tapered surfaces 9b is denoted by O, and an imaginary line extending through the two points P, O is denoted by A. Further, an imaginary perpendicular plane extending through the center O of the ball 7 and perpendicular to the radial direction is denoted by B. In this case, an angle $\alpha$ formed by the imaginary line A and the imaginary perpendicular plane B is set to be larger than a friction angle $\lambda$ ($\tan \lambda = \mu$) determined by a friction coefficient $\mu$ at the contact point P. Namely, with respect to the friction angle $\lambda$ and the friction coefficient $\mu$ the angle $\alpha$ is set to satisfy a relationship of $\tan \alpha > \tan \lambda = \mu \leftrightarrow \alpha < \lambda = \tan^{-1} \mu$.

For example, in the present embodiment, because the friction coefficient $\mu$ at the contact point P between the ball 7 and the tapered surfaces 9b is 0.20 to 0.25, $\alpha > \lambda = \tan^{-1} \mu = 11.3$ to 14(°), and thus a may be set to satisfy $\alpha > 14(°)$.

In this way, by setting the angle $\alpha$ to be larger than the friction angle $\lambda$, even when the balls 7 are strongly pressed against the tapered surfaces 9b of the pockets 9 or when the balls 7 are fitted into the tapered surfaces 9b due to wedge effect, the crown type cage 11 can return to its original rotational neutral position once a force on the tapered surfaces 9b is removed. As a result, progression of problems at the contact point P between the ball 7 and the inner diameter-side convex portions 19 of the pockets 9 can be prevented.

Also, because, as the angle $\alpha$ becomes larger, a reaction force in an normal direction of the contact surface to a pressing force in the radial direction, which is exerted from the ball 7 on the tapered surfaces 9b, can become smaller so that the contact surface pressure can be further reduced, the angle $\alpha$ is preferably set to be larger, so that the contact point P between the ball 7 and the tapered surfaces 9b can be further away from the equatorial portion E of the ball 7 (to be located on the more inner diameter side).

In addition, in a case of a cage having an annular portion 15 only on one side in the axial direction as in the crown type cage 11 of the present embodiment, an expansion amount in the radial direction of distal ends of the pillar portions 17 of the crown type cage 11 due to a centrifugal force during high-speed rotation becomes larger, as compared with proximal portions of the pillar portions 17. Due to this phenomenon, as a radial dimension of the pocket 9 is increased, an opening diameter in the circumferential direction of the pocket 9 is widened, but because the tapered surfaces 9b are only translated in a circumferential direction, a radial position of the contact point P is not changed, and thus the angle $\alpha$ defined by the imaginary line A and the imaginary perpendicular plane B is not changed. On the other hand, even in any cases of conventional examples shown in FIGS. 10 to 13, there is a problem in that a rolling element is contacted with an edge portion, and thus if the same deformation is occurred during high-speed rotation, a contact point between the rolling element and the edge portion is radially outwardly deviated, so that a value corresponding to the angle $\alpha$ as described above becomes smaller. Namely, according to conventional examples, even if the angle $\alpha$ is set to be larger than the friction angle $\lambda$ upon design, a problem is caused in that the angle $\alpha$ becomes smaller than the friction angle $\lambda$ due to deformation action of the pocket due to a centrifugal force, thereby causing the rolling element to be fitted therein. In particular, if a dmn value used exceeds 1 million, the above problem is likely to occur in conventional examples.

A movement amount in the radial direction of the crown type cage 11 is determined by radial gaps between the ball 7 and the tapered surfaces 9b at the neutral position of the crown type cage 11. Thus, by selecting a radial position of the tapered surfaces 9b, a width of the opening on the radially inner side of the pocket 9 and the like taking into account the angle $\alpha$ obtained based on considerations as described above, the crown type cage 11 may be designed so that an appropriate movement amount thereof can be obtained.

The cage 11 as described above can be manufactured by various methods, and accordingly, for example, may be manufactured by machining or manufactured by injection-molding.

As described above, according to the crown type cage 11 of the present embodiment, each pocket 9 of the crown type cage 11 has the cylindrical surface 9a formed by a cylindrical shape having the center line G extending in the radial direction, and tapered surfaces 9b contiguous with the cylindrical surface 9a on a radially inner side or a radially outer side of the cylindrical surface 9a and extending away from the cylindrical surface 9a in the radial direction and toward the center line G, and the radial displacement of the crown type cage 11 is regulated by a contact of the balls 7 with the tapered surfaces 9b. Thus, when the crown type cage 11 is displaced in the radial direction, the balls 7 are brought into contact with the tapered surfaces 9b of the pockets 9, and thus an edge contact is caused, thereby decreasing a contact surface pressure and also preventing scraping of the lubricant. In addition, according to the crown type cage 11, because the contact with the balls 7 is limited to the tapered surfaces 9b, a friction coefficient is stabilized, thereby preventing a generation of a cage noise due to a self-exited vibration of the crown type cage 11.

Further, in a state in which the balls 7 has been contacted with the tapered surfaces 9b, the angle $\alpha$ defined by the imaginary line A, which extends through the center O of the ball 7 and the contact point A between the ball 7 and the tapered surfaces 9b, and the imaginary perpendicular plane B, which extends through the center O of the ball 7 and perpendicular to the radial direction, is set to be larger than the friction angle $\lambda$, as set from the friction coefficient $\mu$ at the contact point P between the ball 7 and the tapered surfaces 9b. Therefore, even when the ball 7 is strongly pressed against the tapered surfaces 9b of the pocket 9 or when the ball 7 is fitted into the tapered surfaces 9b due to wedge effect, the crown type cage 11 can return to its original rotational neutral position once a force on the tapered surfaces 9b is removed. As a result, progression of problems at the contact point P between the balls 7 and the inner diameter-side convex portions 19 of the pocket 9 can be prevented.

In particular, in the case of the ball guided type, in which the tapered surfaces 9b of the pocket 9 are formed on the more inner diameter side than the equatorial portion E of the ball 7 as in the crown type cage 11 of the present embodiment, the pillar portions 17 of the crown type cage 11 are expanded toward the outer diameter side due to a centrifugal force during high-speed rotation, so that radial gaps between the ball 7 and the tapered surfaces 9b become smaller, thereby increasing contact chance between the ball 7 and the inner diameter-side convex portions 19. In addition, during high-speed rotation, a centrifugal whirling force of the crown type cage 11 due to a centrifugal force is increased, and thus a contact pressure between the ball 7 and the tapered surfaces 9b or a pushed-in force of the ball 7 is also increased. In this case, it is very effective to employ the configurations of the present embodiment.

In addition, if, after the deep groove ball bearing 1 having the crown type cage 111 is mounted to a shaft and a housing, an inclination exists between the inner ring 5 and the outer ring 3, contact angles of the balls 7 are different from each other and thus revolution speeds of the balls 7 are deviated from each other, so that a driving force from each ball 7 on the pocket 9 (a force of the ball 7 pressing the cylindrical surface 9a of the pocket 9) is varied, and as a result, the crown type cage 11 is not rotated at the rotational neutral position, but is rotated in a state deviated in any direction of the radial direction. Even in this case, because the contact chance and the contact pressure between the ball 7 and the tapered surfaces 9b are increased, it is very effective to employ the configurations of the present embodiment.

Figure 3:
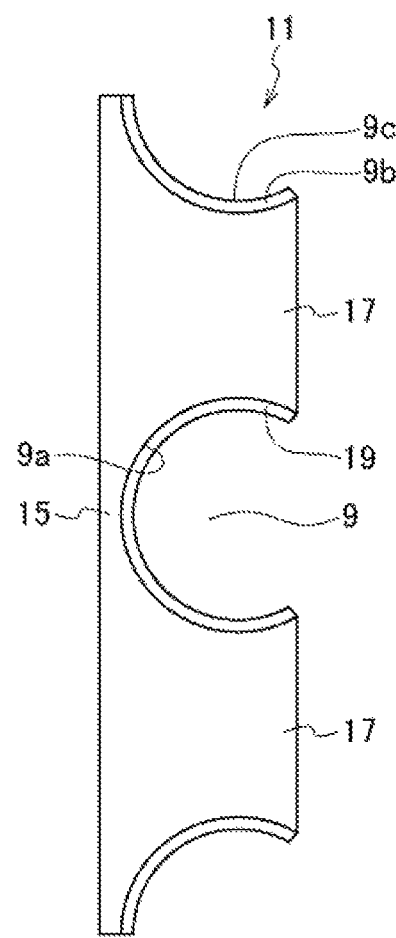
FIG. 3 is a plane view of a portion of a crown type cage according to a modified example of the first embodiment.

In the crown type cage 11 of the present embodiment, a pair of inner diameter-side convex portions 19, 19 are provided inside the pocket 9 on both sides in the circumferential direction thereof (see FIG. 2A). However, it is not limited to this configuration, and as shown in FIG. 3, there may be a configuration in which an inner diameter-side convex portion 19 is provided inside the pocket 9 to extend along the entire periphery thereof.

(Second Embodiment)

Next, an angular ball bearing 1A having a machined cage 11A according to a second embodiment of the present invention will be described. In the following description with respect to the machined cage 11A and the angular ball bearing 1A of the present embodiment, the same or similar portions as those of the crown type cage 11 and the deep groove ball bearing 1 of the first embodiment are denoted by the same reference signs and the description thereof will be simplified or omitted.

Figure 4:
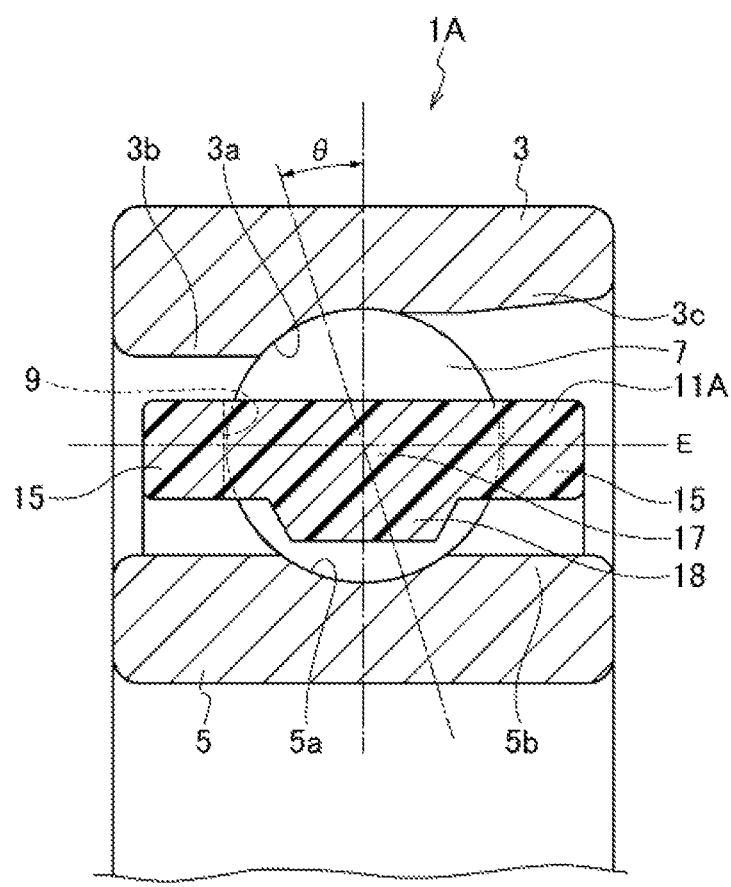
FIG. 4 is a sectional view of an angular ball bearing according to a second embodiment.

As shown in FIG. 4, the angular ball bearing 1A has an outer ring 3 having an outer ring raceway 3a on an inner peripheral surface thereof, an inner ring 5 having an inner ring raceway 5a on an outer peripheral surface thereof, a plurality of balls 7 rollably provided between the outer ring raceway 3a and the inner ring raceway 5a, and the machined cage 11A adapted to rollably retain the balls 7 in pockets 9 and arranged between the outer ring 3 and the inner ring 5. Also, Grease as a lubricant is potted in the inner space of the angular ball bearing 1A.

The inner peripheral surface of the outer ring 3 has a shoulder portion 3b formed on one side in an axial direction of the outer ring raceway 3a and a counter bore 3c formed on the other side in the axial direction, and the outer peripheral surface of the inner ring 5 has shoulder portions 5b formed on both sides in an axial direction of the inner ring raceway 5a. Also, the angular ball bearing 1A has a contact angle θ during rest, and exerts a radial load and a thrust load.

The machined cage 11A is a ball guided type cage made of a synthetic resin, in which carbon fibers (CF) are added to polyphenylene sulfide (PPS) resin to enhance strength thereof.

Figure 5A:
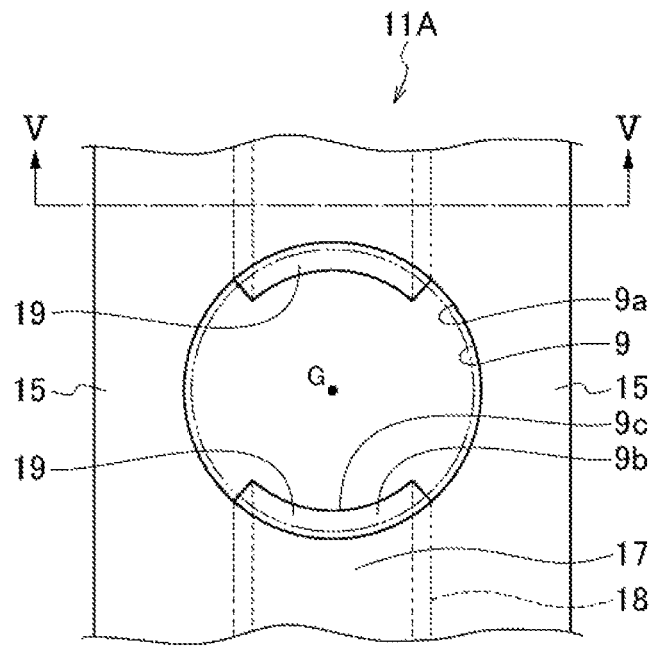
FIG. 5A is a plan view of a portion of a machined cage shown in FIG. 4.
Figure 5B:
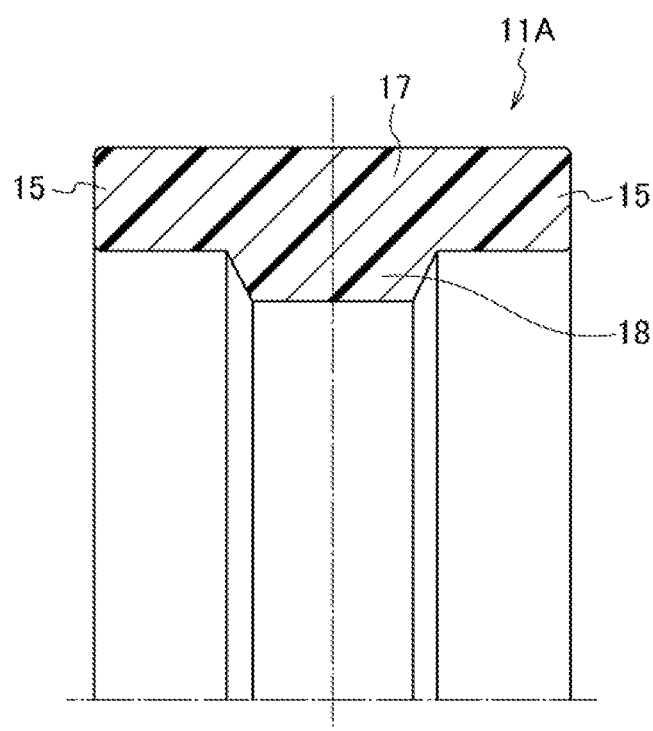
FIG. 5B is a partially sectional view taken along the line V-V in FIG. 5A.

Referring to FIGS. 5A and 5B, the machined cage 11A is formed in a stepped structure including annular portions 15 and 15 on both sides in an axial direction thereof, a plurality of pillar portions 17 connecting the annular portions 15 and 15 with each other, and a projection 18 projecting from a middle portion in the axial direction of an inner diameter-side surface of each pillar portion 17 toward on the inner diameter side, and the annular portions 15 and 15, the adjacent pillar portions 17 and the projections 18 form a plurality of pockets 9 for rollably retaining the balls 7.

The projections 18 have a trapezoid shape in which an axial width in a radial cross section thereof is decreased as they go toward on the inner diameter side, and are formed at a position opposing the inner ring raceway 5a in the axial direction. Also, an inner diameter of the projections 18 is set to be slightly larger than the shoulder portion 5b of the inner ring 5, thereby obtaining insertion ability upon assembly of the machined cage 11A.

Each pocket 9 of the machined cage 11A has a cylindrical surface 9a formed by a cylindrical shape having a center line G extending in the radial direction, and a pair of tapered surfaces 9b contiguous with the cylindrical surface 9a on a radially inner side of the cylindrical surface 9a and extending away from the cylindrical surface 9a and toward the center line G, and is formed to penetrate in the radial direction.

The pair of tapered surfaces 9b, which are respectively provided on the adjacent pillar portions 17, 17, are formed by inner diameter-side convex portions 19, 19 extending from the cylindrical surface 9a and a pair of projections 18 and 18 toward the center line G, and arranged on both sides in a circumferential direction of the pocket 9. In this way, because the inner diameter-side convex portions 19 forming the tapered surfaces 9b are not provided inside the pocket 9 on both sides in the axial direction, a gap is generated between the ball 7 and the pocket 9, thereby allowing a lubricant to be supplied through the gap. Alternatively, if required, a configuration in which an inner diameter-side convex portion 19 is provided to extend along the entire periphery of the cylindrical surface 9a of the pocket 9 may be employed.

Each of the pair of tapered surfaces 9b is contiguous with the cylindrical surface 9a on the more inner diameter-side than an equatorial portion (a position of a pitch circle of the ball 7) E of the ball 7, is formed on a single cone and also has a generally circular arc shape as viewed in the radial direction.

The inner diameter-side convex portions 19 have, on inner diameter-side ends the tapered surfaces 9b, straight surfaces 9c formed substantially parallel to the center axis G by chamfering. The straight surfaces 9c prevent occurrences of problems, such as burs or whiskers, during machining or injection-molding of the machined cage 11A. Alternatively, on the inner diameter-side convex portions 19, rounded curved surfaces may be formed, instead of the above straight surfaces 9c.

Herein, a radial displacement of the machined cage 11A is regulated by a contact of the balls 7 with the tapered surfaces 9b of the inner diameter-side convex portions 19. Namely, when the machined cage 11A is moved radially outward, i.e., when the ball 7 is relatively moved radially inward (as shown by a solid line in FIG. 2B), the machined cage 11A is configured so that contact thereof with the balls 7 is limited to the tapered surfaces 9b.

Herein, an angle α defined in the same manner as that of the first embodiment is set to be larger than a friction angle λ (tan λ=μ) determined by a friction coefficient μ at the contact point P between the ball 7 and the tapered surfaces 9b. Namely, the angle α is set to satisfy tan α>tan λ=μ ↔ α>λ=tan$^{-1}$μ with respect to the friction angle λ and the friction coefficient μ.

As described above, according to the angular ball bearing 1A and the machined cage 11A of the second embodiment, because the inner diameter-side convex portions 19 having the tapered surfaces 9b are provided on the projections 18 projecting from middle portions in the axial direction of the inner diameter-side surfaces of the pillar portions 17 toward on the inner diameter side and opposing the inner ring raceway 5a, contact between the machined cage 11A and the inner ring raceway 5a can be prevented, and at the same time, the contact point P between the ball 7 and the tapered surfaces 9b can be caused to be slightly deviated toward on the inner diameter side, thereby increasing the angle α. In particular, during high-speed rotation or under a condition in which a bearing temperature is high as in motor bearings or the like, when the angle α needs be designed to be larger taking into account the case where lubricating ability is temporarily decreased and thus the friction coefficient μ are increased, it is very effective to employ the stepped structure having the projections 18 of the present embodiment.

The other effects are the same as those of the deep groove ball bearing 1 and the crown type cage 11 according to the first embodiment.

(Third Embodiment)

Next, an angular ball bearing 1B having a machined cage 11B according to a third embodiment of the present invention will be described. Because the machined cage 11B and the angular ball bearing 1B of the present embodiment have the same basic configurations as those of the machined cage 11A and the angular ball bearing 1A of the second embodiment, the same or similar portions are denoted by the same reference signs and the description thereof will be simplified or omitted.

Figure 6:
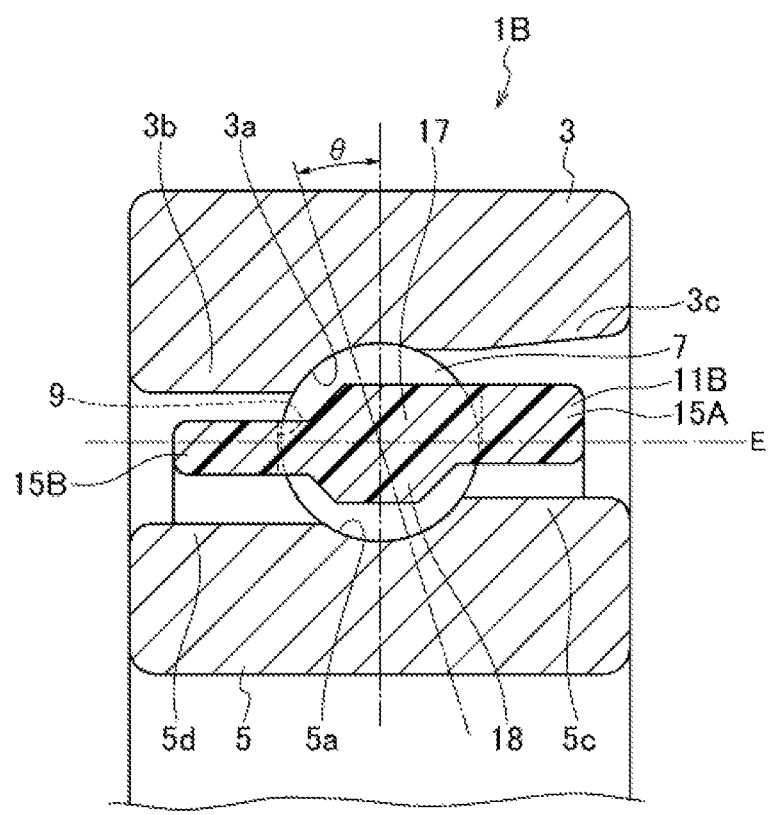
FIG. 6 is a sectional view of an angular ball bearing according to a third embodiment.

As shown in FIG. 6, the angular ball bearing 1B of the present embodiment is provided, on an outer peripheral surface of an inner ring 5 thereof, with a large diameter shoulder portion 5c located toward a counter bore 3c of an outer ring 3 thereof, and a small diameter shoulder portion 5d located toward a shoulder portion 3b of the outer ring 3 and having a smaller diameter than that of the large diameter shoulder portion 5c.

Also, the machined cage 11B is a ball guided type cage made of a synthetic resin, in which carbon fibers (CF) are added to polyether ether ketone (PEEK) resin to enhance strength thereof, and is formed in a stepped structure, in which an outer diameter thereof is changed in accordance with an outer diameter of the outer ring 3 and an inner diameter thereof is changed in accordance with an outer diameter of the inner ring 5. More specifically, the machined cage 11B is formed so that the outer diameter thereof satisfies a relationship of 'an outer diameter of an annular portion 15A radially opposing the counter bore 3c of the outer ring 3=an outer diameter of pillar portions 17>an inner diameter of the shoulder portion 3b of the outer ring 3>an outer diameter of an annular portion 15B radially opposing the shoulder portion 3b of the outer ring 3', and also so that the inner diameter thereof satisfies a relationship of 'an inner diameter of the annular portion 15A>an inner diameter of the annular portion 15B>an outer diameter of the large diameter shoulder portion 5c of the inner ring 5>an inner diameter of projections 18>an outer diameter of the small diameter shoulder portion 5d of the inner ring 5'.

In particular, because the machined cage 11B is configured so that the outer diameter of the large diameter shoulder portion 5c of the inner ring 5>the inner diameter of the projections 18>the outer diameter of the small diameter shoulder portion 5d of the inner ring 5, a position of the projections 18, which are provided with inner diameter-side convex portions 19 having tapered surfaces 19b, can be further deviated toward the inner diameter side, and therefore, by slightly deviating a contact point P between a ball 7 and the tapered surfaces 9b toward the inner diameter side, an angle α can become larger and also a contact surface pressure can be decreased.

The other effects are the same as those of the angular ball bearing 1A and the machined cage 11A according to the second embodiment.

(Fourth Embodiment)

Next, a deep groove ball bearing 1C having a crown type cage 11C according to a fourth embodiment of the present invention will be described. Because the crown type cage 11C and the deep groove bearing 1C of the present embodiment have the same basic configurations as those of the crown type cage 11 and the deep groove ball bearing 1 of the first embodiment, the same or similar portions are denoted by the same reference signs and the description thereof will be simplified or omitted.

Figure 7:
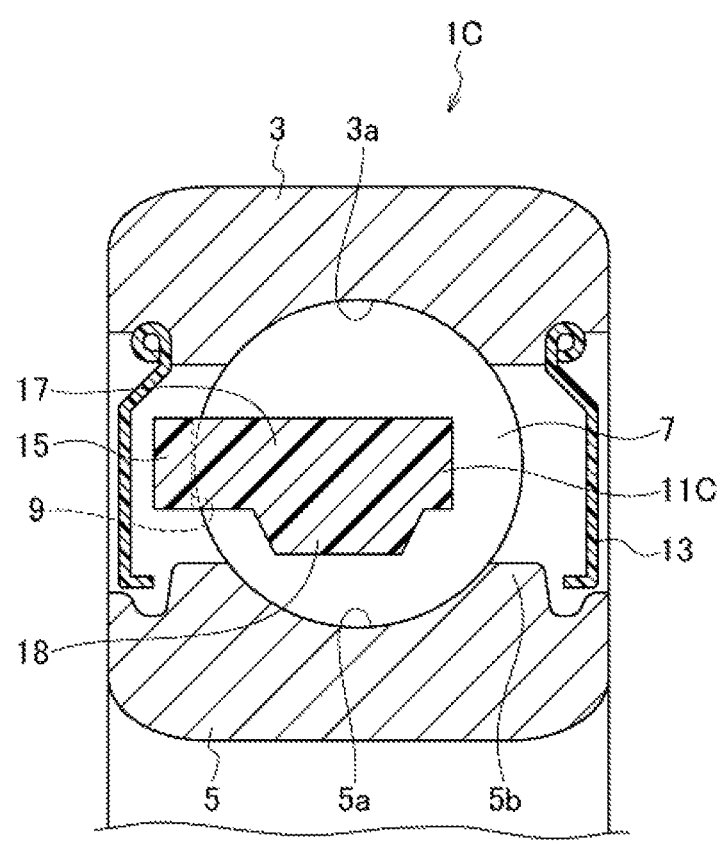
FIG. 7 is a sectional view of a deep groove ball bearing according to a fourth embodiment.

As shown in FIG. 7, the crown type cage 11C of the present embodiment is formed in a stepped structure, in which projections 18 project from inner diameter-side surfaces of pillar portions 17 toward the inner diameter side, similarly to the second embodiment. The projections 18 have a trapezoid shape in which an axial width thereof is decreased as they go toward on the inner diameter side, and are formed at a position opposing an inner ring raceway 5a in the axial direction. Also, an inner diameter of the projections 18 is set to be slightly larger than the shoulder portion 5b of the inner ring 5, thereby obtaining insertion ability upon assembly of the crown type cage 11C.

As described above, the deep groove ball bearing 1C and the crown type cage 11C of the present embodiment can achieve the same effects as those of the angular ball bearing 1A and the machined cage 11A according to the second embodiment.

(Fifth Embodiment)

Next, a cylindrical roller bearing 1D having a crown type cage 11D according to a fifth embodiment of the present invention will be described. Because the crown type cage 11D and the cylindrical roller bearing 1D of the present embodiment have the same basic configurations as those of the crown type cage 11 and the deep groove ball bearing 1 of the first embodiment, the same or similar portions are denoted by the same reference signs and the description thereof will be simplified or omitted.

Figure 8:
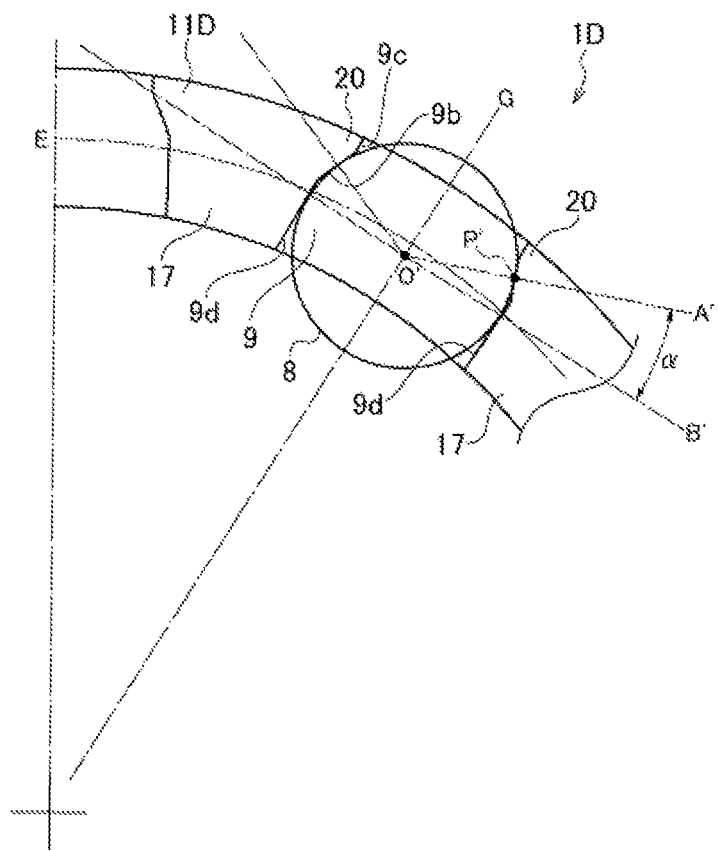
FIG. 8 is a side view of a portion of a crown type cage according to a fifth embodiment.
Figure 9:
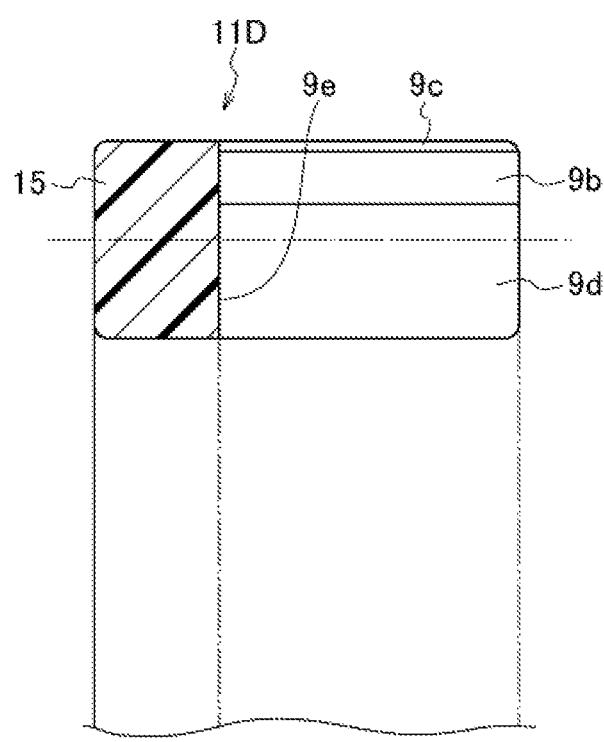
FIG. 9 is a sectional view of the crown type cage of FIG. 8.
Figure 10:
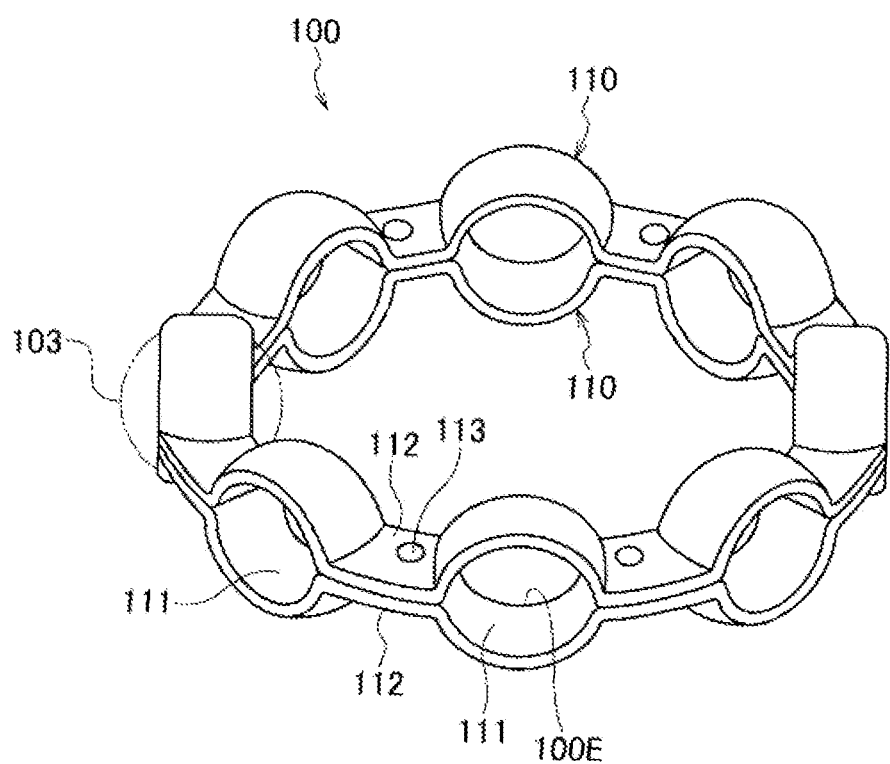
FIG. 10 is a perspective view of a conventional cage.
Figure 11A:
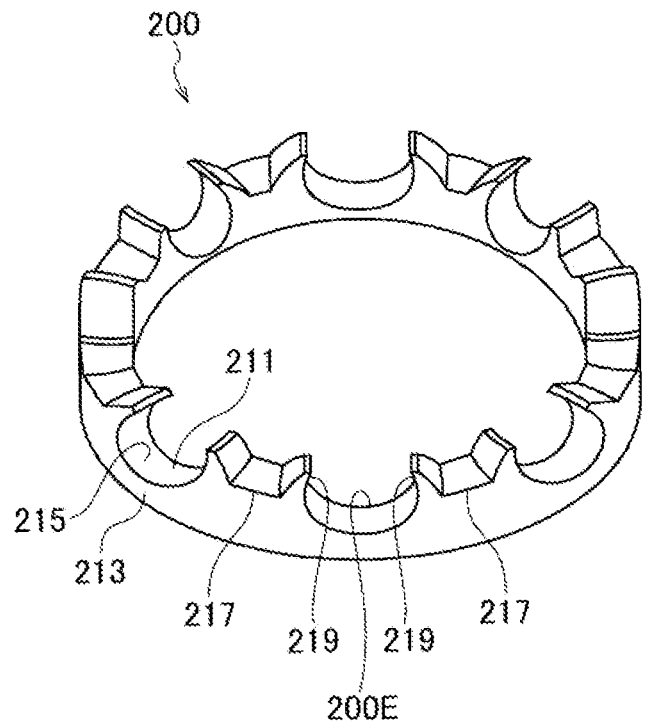
FIG. 11A is a perspective view of a conventional cage.
Figure 11B:
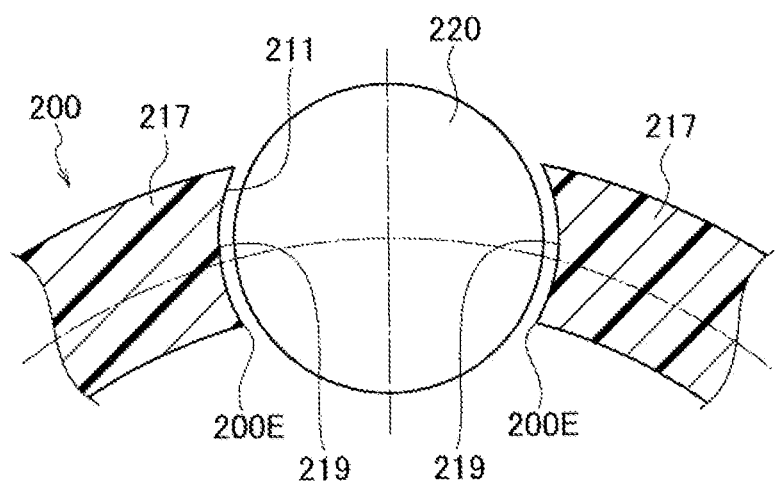
FIG. 11B is a partially sectional view of FIG. 11A.
Figure 12:
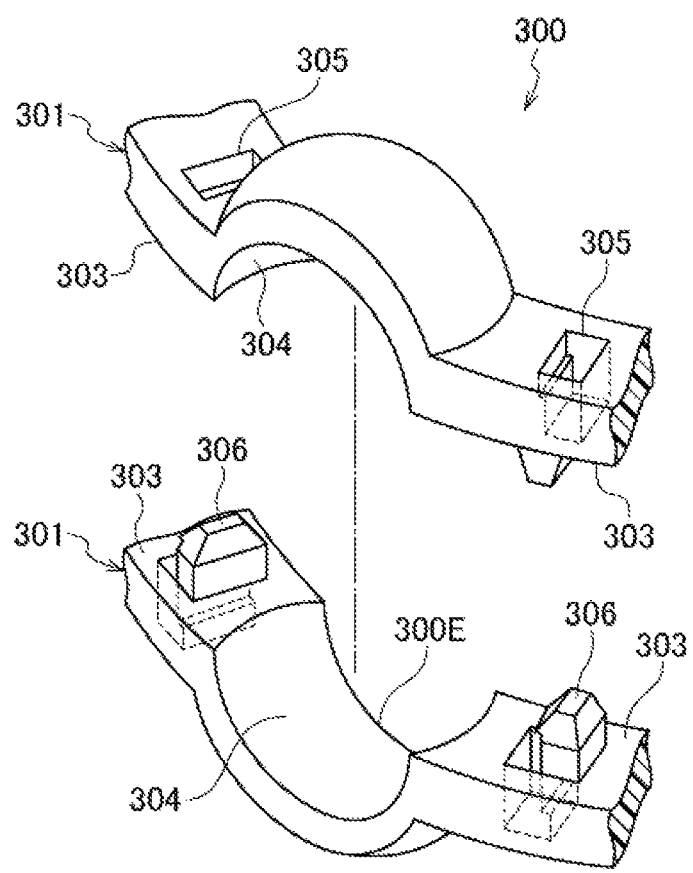
FIG. 12 is a partially exploded perspective view of a conventional cage.

As shown in FIGS. 8 and 9, the cylindrical roller bearing 11D has cylindrical rollers 8 as rolling elements, and the crown type cage 11D is a cylindrical roller guided type case made of a synthetic resin.

The crown type cage 11D includes an annular portion 15 and a plurality of pillar portions 17 axially extending from the annular portion 15 and arranged at given intervals in a circumferential direction thereof, and the annular portion 15 and the adjacent pillar portions 17, 17 form a plurality of pockets 9 for rollably retaining the cylindrical rollers 8. Each pocket 9 of the crown type cage 11D has a pair of flat surfaces 9d parallel to a center line G extending in a radial direction, a pair of tapered surfaces 9b contiguous with the flat surfaces 9d on a radially outer side of the flat surfaces 9d and extending away from the flat surfaces 9d in the radial direction, i.e. toward a radially outer side, and toward the center line G, straight surfaces 9c each connected to an outer diameter-side end of each of the pair of tapered surface 9b and formed substantially parallel to the center axis G by chamfering, and an inner surface 9e of the annular portion 15.

The pair of tapered surfaces 9b and straight surfaces 9c are respectively provided on the adjacent pillar portions 17, 17, and are formed by outer diameter-side convex portions 20 and 20 extending from the flat surfaces 9d toward the center line G and arranged on both sides in a circumferential direction of the pocket 9.

Herein, a radial displacement of the crown type cage 11D is regulated by a contact of the cylindrical rollers 8 with the tapered surfaces 9b of the outer diameter-side convex portions 20. Namely, when the crown type cage 11D is moved radially inward, i.e., when the cylindrical rollers 8 are relatively moved radially outward, the crown type cage 11D is configured so that contact thereof with the cylindrical rollers 8 is limited to the tapered surfaces 9b.

In addition, according to the present embodiment, an imaginary plane including a contact line P' between the cylindrical roller 8 and the tapered surfaces 9b of the outer diameter-side convex portions 20 and the center axis O' of the cylindrical roller 8 is denoted by A', and an imaginary perpendicular plane extending through the center axis O' of the cylindrical roller 8 and perpendicular to the radial direction is denoted by B'. In this case, an angle α formed by the imaginary plane A' and the imaginary perpendicular plane B' is set to be larger than a friction angle λ (tan λ=μ) determined by a friction coefficient μ at the contact location P'. Namely, with respect to the friction angle λ and the friction coefficient μ, the angle α is set to satisfy a relationship of tan α>tan λ≲α>λ=tan$^{-1}$μ.

The crown type cage 11D and the cylindrical roller bearing 1D configured as described above can also achieve the same effects as those of the deep groove ball bearing 1 and the crown type cage 11 according to the first embodiment.

The present invention is not limited to the foregoing embodiments, and changes and modifications may be made therein as appropriate.

For example, the rolling bearing according to the present invention may be suitably employed to support a spindle in a spindle device of machine tools or the like, or also may be applied to support a motor shaft of high-speed motors.

Also, for materials of the cage, polyimide (PI), phenol resin and the like other than synthetic resins mentioned in the foregoing embodiments, may be used as a base material, and aramid fibers may be used as a reinforcing material. In addition, the cage is not limited to one made of synthetic resins, but copper alloys or iron-based materials plated with silver may be used. In such as case, the angle α can be set in accordance with a friction coefficient μ (friction angle λ) between the cage material and rolling elements.

Further, although, as the friction coefficient μ, a static friction coefficient and a dynamic friction coefficient exist, the angle α is preferably set based on a largest friction coefficient μ so that desired effects can be achieved under either condition of a case where a bearing is rotated from a rest state and a case where the bearing is continuously being rotated.

In addition, although the tapered surfaces 9b in the ball bearings of the first to fourth embodiments have been formed on the radially inner side of the cylindrical surface 9a, the tapered surfaces 9b may be formed on the radially outer side thereof. Also, although the tapered surfaces 9b in the cylindrical roller bearing of the fifth embodiment have been formed on the radially outer side of the flat surfaces 9d, the tapered surfaces 9b may be formed on the radially inner side thereof.

This application is based on Japanese Patent Application No. 2011-194165 filed on Sep. 6, 2011, the content of which is incorporated herein by reference.

DESCRIPTION OF REFERENCE SIGNS 1, 1C Deep groove ball bearing (Rolling bearing)
1A, 1B Angular ball bearing (Rolling bearing)
1D Cylindrical roller bearing (Rolling bearing)
7 Ball
8 Cylindrical roller
9 Pocket
9a Cylindrical surface
9b Tapered surface
9c Straight surface
9d Flat surface
11, 11C, 11D Crown type cage (Rolling bearing cage)
11A, 11B Machined cage (Rolling bearing cage)
19 Inner diameter-side convex portion (Convex portion)
20 Outer diameter-side convex portion (Convex portion)
A Imaginary line
A' Imaginary plane
B, B' Imaginary perpendicular plane
G Center line
O Center
O' Center axis
P Contact point
P' Contact line, Contact location
α Angle
λ Friction angle
μ Friction coefficient

The invention claimed is:

1. A rolling bearing cage of a ball guided type, the cage comprising a plurality of pockets provided at given intervals in a circumferential direction to retain a plurality of balls respectively,
   wherein each pocket of the cage comprises a cylindrical surface formed by a cylindrical shape having a center line extending in a radial direction, and at least one tapered surface contiguous with the cylindrical surface on a radially inner side or a radially outer side of the cylindrical surface and extending away from the cylindrical surface in the radial direction and toward the center line;
   wherein a radial displacement of the cage is regulated by a contact of the ball with the tapered surface, and
   wherein, in a state in which the ball is in contact with the tapered surface, an angle formed by an imaginary line extending through a center of the ball and a contact point between the ball and the tapered surface, and an imaginary perpendicular plane extending through the center of the ball and perpendicular to the radial direction, is larger than a friction angle defined by a friction coefficient at the contact point between the ball and the tapered surface.

2. The rolling bearing cage according to claim 1, wherein the pocket comprises a pair of tapered surfaces provided on adjacent pillar portions respectively and opposed to each other in the circumferential direction, and
   wherein the tapered surfaces are formed by convex portions provided on a radially inner side or a radially outer side of the pillar portions and extending toward the center line.

3. The rolling bearing cage according to claim 1, wherein the cage is made of a synthetic resin.

4. A rolling bearing comprising the rolling bearing cage according to claim 1.

5. A rolling bearing cage of a roller guided type, the cage comprising a plurality of pockets provided at given intervals in a circumferential direction to retain a plurality of cylindrical rollers respectively,
   wherein each pocket of the cage comprises a pair of flat surfaces parallel to a center line extending in a radial direction, and at least one tapered surface contiguous with the flat surfaces on a radially inner side or a radially outer side of the flat surfaces and extending away from the flat surfaces in the radial direction and toward the center line;

wherein a radial displacement of the cage is regulated by a contact of the cylindrical roller with the tapered surface, and wherein, in a state in which the cylindrical roller is in contact with the tapered surface, an angle formed by an imaginary plane including a center axis of the cylindrical roller and a contact line between the cylindrical roller and the tapered surface, and an imaginary perpendicular plane extending through the center axis of the cylindrical roller and perpendicular to the radial direction, is larger than a friction angle defined by a friction coefficient at a contact location between the cylindrical roller and the tapered surface.

6. The rolling bearing cage according to claim 5, wherein the pocket comprises a pair of tapered surfaces provided on adjacent pillar portions respectively and opposed to each other in the circumferential direction, and the tapered surfaces are formed by convex portions provided on a radially inner side or a radially outer side of the pillar portions and extending toward the center line.

7. The rolling bearing cage according to claim 5, wherein the cage is made of a synthetic resin.

8. A rolling bearing comprising the rolling bearing cage according to claim 5.

* * * * *